(No Model.)
W. G. PRICE.
STREET CAR BRAKE.
No. 582,372. Patented May 11, 1897.
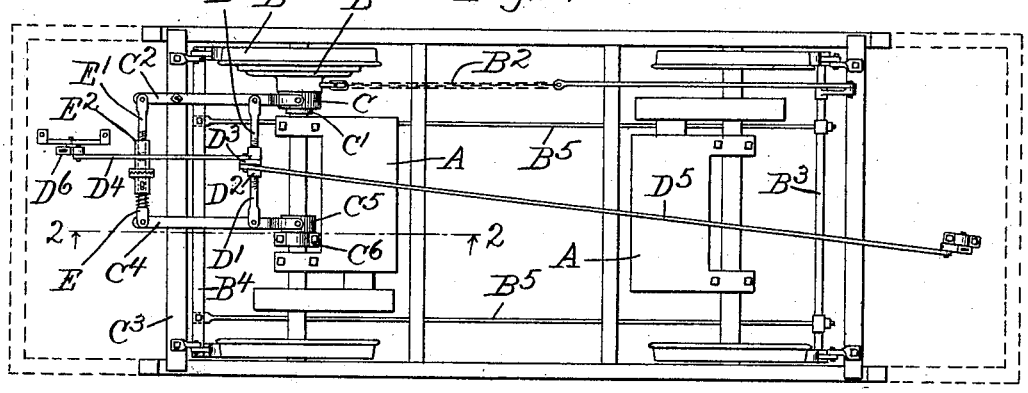
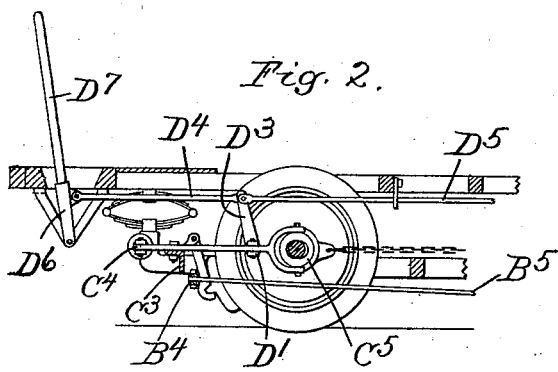
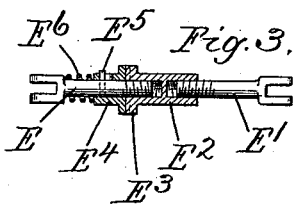
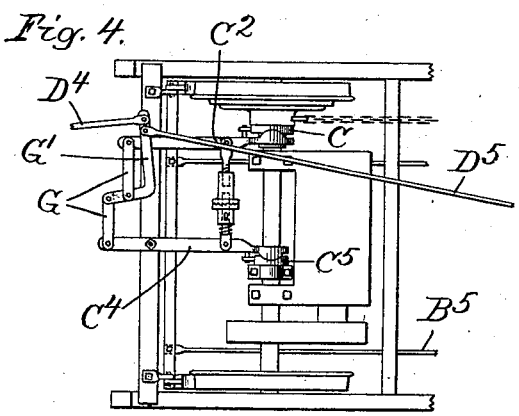
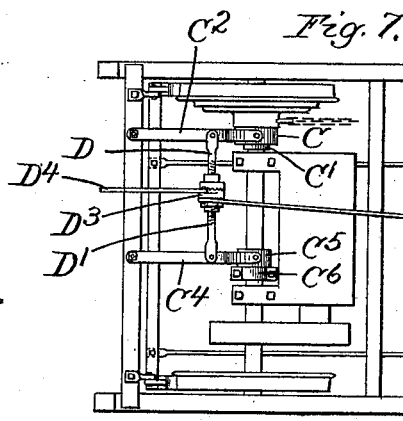
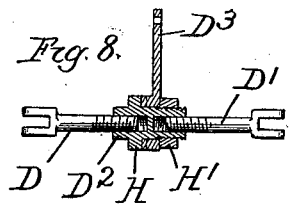
Witnesses.
E. T. Wray
Donald M. Carter
Inventor
William G. Price
by Francis W. Parker
his Atty.

UNITED STATES PATENT OFFICE.

WILLIAM G. PRICE, OF CHICAGO, ILLINOIS, ASSIGNOR OF ONE-HALF TO MENARD K. BOWEN, OF SAME PLACE.

STREET-CAR BRAKE.

SPECIFICATION forming part of Letters Patent No. 582,372, dated May 11, 1897.

Application filed December 3, 1896. Serial No. 614,379. (No model.)

*To all whom it may concern:*

Be it known that I, WILLIAM G. PRICE, a citizen of the United States, residing at Chicago, in the county of Cook and State of Illinois, have invented certain Improvements in Street-Car Brakes, of which the following is a specification.

My invention relates to brakes for street-cars and other vehicles, and has for its object to provide certain new and useful improvements in the construction of such brakes.

My invention is illustrated in the accompanying drawings, wherein—

Figure 1 is a plan view of a car-truck provided with a brake embodying my invention. Fig. 2 is a section on line 2 2, Fig. 1. Fig. 3 is a detail sectional view of adjusting mechanism. Fig. 4 is a plan view of a portion of a car-truck, showing a modified operative mechanism for the brake. Fig. 5 is a detailed view of one of the brake-operating levers. Fig. 6 is a view of the collar on the axle opposed to the said lever. Fig. 7 is a plan view of a portion of a car-truck, showing a modified form of mechanism for operating the brake. Fig. 8 is a sectional view of the adjusting and actuating device.

Like letters refer to like parts throughout the several figures.

I have shown in the present application a braking mechanism operated on a similar plan to the brake mechanism shown in my patent application, Serial No. 594,739, filed June 8, 1896.

In Fig. 1 I have shown a car-truck provided with the electric motors A A, connected to the car-axles. On one of the axles is located a friction-disk B, opposed to the wheel B'. A chain or other power-transmitting device $B^2$ is connected with said disk and is also connected with the brake-shoes. The disk is normally stationary, but is provided with controlling mechanism by which it may be forced against the wheel, so that it will turn with said wheel. The turning of this disk actuates the chain $B^2$ and applies the brake. The chain $B^2$ is connected to the brake-beam $B^3$, said beam being connected with brake-beam $B^4$ by the rod $B^5$. It is of course evident that any other suitable connection may be made between the disk B and the brake-shoes and that any kind of brake may be used in place of the brake herein shown. I have shown the friction-disk in proximity to one of the wheels, but it is of course evident that this friction-disk may be opposed to any moving part on the axle. The disk B is free to move along the axle, so that it may normally be out of engagement with the wheel, but is adapted to be moved into engagement with said wheel. A collar C is located in proximity to said disk and is movable along the axle, the disk and collar being so related that a movement of the collar will also move the disk.

An arm $C^2$ is connected with the collar C in any desirable manner, as by being pivoted thereto, and is fixed to the car frame or truck, for example, by being connected with the cross-piece $C^3$, as shown. The connection between the arm $C^2$ and the collar C prevents said collar from rotating. An arm $C^4$ is connected to a collar $C^5$ on the axle, said collar being held stationary and being opposed to a stop $C^6$, which limits its movement. A rod D is connected with the arm $C^2$, the arm $C^4$ being provided with a similar rod D'. The ends of these rods are provided with right and left screw-threads, which engage similar threads in the coupling piece or collar $D^2$. The piece $D^2$ is provided with an arm $D^3$, to which are connected the rods $D^4$ $D^5$, running one to each end of the car, said rods being connected to sockets $D^6$, adapted to receive the operating-handle $D^7$.

When my braking mechanism is used upon cars supplied with electric motors, it is found that the motors occupy so much of the axle that the disk which operates the brake works most satisfactorily when given only a small amount of lateral movement. It is therefore desirable to have an adjusting mechanism associated with the arms $C^2$ and $C^4$, so that they may be adjusted when the parts become worn. Any movable adjusting device may be used. I have shown in the drawings one form of adjusting device consisting of the rods E E', which are connected to the arms $C^2$ and $C^4$, said rods being provided at their ends with right and left screw-threads which engage the sleeve $E^2$, the end of said sleeve being provided with a collar $E^3$, having projecting teeth thereon which engage similar teeth on a sleeve $E^4$. The sleeve $E^4$ is connected with the rod E by means of a pin $E^5$, said pin working in a slot in the sleeve, so that the sleeve may be moved longitudinally. A spring $E^6$ normally holds the sleeve $E^4$ in position, so that it engages with the sleeve $E^2$. When it is desired to adjust the mechanism, the sleeve $E^4$ is moved away from the sleeve $E^2$ and said sleeve rotated until the desired adjustment is obtained. In Fig. 4 I have shown a similar mechanism operated by a system of levers instead of by means of a screw device. In this construction the ends of the arms $C^2$ and $C^4$ are enlarged at F and encircle the axle. The ends F are provided with the circular projections F', which fit into corresponding hollows in the collars C $C^5$. To the ends of the arms $C^2$ and $C^4$ are connected the links G, said links being connected to the bell-crank lever G', to which are connected the rods $D^4$ $D^5$.

In Fig. 1 I have shown the actuating mechanism between the axle and the adjusting device at the ends of the arms $C^2$ and $C^4$, while in Fig. 4 the position of these parts is reversed.

In Fig. 7 I have shown a construction similar to that shown in Fig. 1, both the arms $C^2$ and $C^4$ being rigidly connected with some part of the car or truck. In this case the adjusting and actuating devices are combined, and their construction is illustrated in Fig. 8. The rods D D' are provided with right and left screw-threads which engage threads in the sleeve $D^2$. Said sleeve is provided with a collar H, having projections or teeth on its surface. The arm $D^3$ is loosely mounted on sleeve $D^2$ and is provided with projecting teeth which engage the teeth on the collar H. A nut H' on the sleeve $D^2$ normally holds the arm $D^3$ in engagement with the collar H, so that when the arm is moved the sleeve $D^2$ will also be moved. When it is desired to adjust the parts, the nut H' is loosened and the sleeve $D^2$, being free from the arm $D^3$, is moved sufficiently to secure the desired adjustment.

I have described the several parts of my device in detail, but it is evident that the parts may be varied in form, construction, and arrangement without departing from the spirit of my invention, and I therefore do not wish to be limited to the construction herein shown and described.

The use and operation of my invention are as follows: When the car is running normally, the disk B is away from its opposed surface. When it is desired to set the brakes, the person in control of the car moves the actuating-lever $D^7$, thereby moving the rod $D^4$ and rotating the coupling piece or sleeve $D^2$. If the arm $D^7$ is moved in one direction, the rotation of the sleeve $D^2$ forces the ends of the arms $C^2$ and $C^4$, which are connected with the sleeves or collars C and $C^5$, so as to separate said ends, and since the movement of the end of lever $C^4$ is limited by the stop $C^6$ such a rotation of the sleeve $B^2$ will move the disk B into contact with the car-wheel. Said disk then rotates with the wheel and moves the chain $B^2$, so as to actuate the brake-shoes and apply them to the wheel. When it is desired to release the brakes, the lever $D^7$ is moved in an opposite direction, thereby engaging the ends of the arms $C^2$ and $C^4$ nearer together. This movement of the arms releases the pressure on the disk B and allows it to become disengaged from the wheel.

In my former application, Serial No. 594,739, I illustrated a brake mechanism to be used on cars operated by electric motors, such mechanism particularly adapted for cars in which the motors are so constructed that there is only a small part of the axle between the motor and the wheel for the brake mechanism. The mechanism shown in my former application is so constructed that better results are produced by having the outer ends of the operating-levers loose, so that they are free to move laterally. In the present application I obtain the best results by fixing the outer ends of the operating-levers to the car frame or truck, so that they have no lateral movement.

The mechanism of my present application is adapted to be used when the construction of the motor is such as to leave room on the axle for the attachment of one of the levers between the points where the motor is supported upon said axle.

In my application filed December 3, 1896, Serial No. 614,378, I have shown a construction for operating the brake mechanism in which the ends of the controlling parts are free to move with relation to the car body or truck. In my present application the ends of these devices are fixed to the car body or truck.

I claim—

1. In a car-brake device, the combination of a movable friction device, opposed to a moving part associated with the car-axle, a fixed opposed surface, two parts interposed between said friction device and fixed opposed surface, said parts fixed at or near their outer ends to the car body or truck, and an actuating mechanism adapted to move said interposed parts so as to move said friction device against its opposed surface, and a connection between said friction device and the brake-shoes.

2. In a car-brake device, the combination of a rotatable friction device, opposed to a moving part associated with the car-axle, a fixed opposed surface, two parts interposed between said friction device and fixed opposed surface, said parts fixed at or near their outer ends to the car body or truck, an actuating mechanism adapted to separate the ends of the intermediate parts associated with the friction device and stop, so as to move said friction device against its opposed surface, a connection between said friction device and the brake-shoes, and an adjusting device whereby said parts may be adjusted when they become worn.

3. In a brake for vehicles, the combination of a brake with means for setting the same, comprising a movable friction device opposed to a moving part on the axle, a fixed bearing or stop in rigid relation to said moving part, two parts intermediate between said moving part and the fixed bearing, a screw device associated with said two parts and adapted when operated to separate them so as to apply the movable friction device to the moving part, said two parts attached to the car, frame or truck, so as to be fixed against lateral motion.

4. In a brake for vehicles, the combination of a disk opposed to a moving part on the car and operatively connected with the brake-shoes, two arms, one associated with said disk and the other with a fixed stop on the axle, a connection between said arms and the car body or frame, which prevents the outer ends of the arms from moving laterally, and an actuating mechanism located between said arms and adapted to separate them so as to force said disk against its opposed surface and apply the brakes.

5. In a brake for vehicles, the combination of a disk opposed to a moving part on the car and operatively connected with the brake-shoes, two arms, one associated with said disk and the other with a fixed stop on the axle, said arms being connected at or near one end to the car body or frame so as to be fixed against lateral motion, an actuating mechanism located between said arms and adapted, when operated, to separate them so as to force said disk against its opposed surface, and an adjusting mechanism associated with said actuating mechanism and adapted to allow the parts to be adjusted for wear.

6. In a brake for vehicles, the combination of a friction device opposed to a moving part on the axle, and operatively connected with the brake-shoes, two arms, one associated with said disk and the other with a fixed stop on the axle, said arms being connected with the car body or frame at or near their outer ends so as to be fixed against lateral motion, a rod or piece connected with each of said arms and provided with screw-threads which engage an internally-threaded sleeve, the parts so constructed that when said sleeve is rotated, the position of said arms is varied and a connection between said sleeve and an operating-lever on the car.

7. In a brake for vehicles, the combination of a friction device, opposed to a moving part on the axle, and operatively connected with the brake-shoes, two arms, one associated with said disk and the other with a fixed stop on the axle, said arms being connected with the car body or frame at or near their outer ends so as to be fixed against lateral motion, a rod or piece connected with each of said arms and provided with screw-threads which engage an internally-threaded sleeve, the parts so constructed that when said sleeve is rotated, the position of said arms is varied and a connection between said sleeve and an operating-lever on the car, and an adjusting device associated with said sleeve, so constructed as to allow the position of said rods or pieces to be adjusted with relation to each other.

8. In a brake for vehicles, the combination of a friction device opposed to a moving part on the car and operatively connected with the brake-shoes, two arms, one associated with said friction device and the other with a fixed stop on the axle, said arms connected with the car body or frame at their ends so as to be fixed against lateral movement, each of said arms provided with an inwardly-projecting part, having a screw-threaded end, said ends being provided, respectively, with a right and left hand thread, said screw-threaded ends engaging an internally-screw-threaded sleeve, a lever engaging said sleeve when in a predetermined position so as to rotate the same when moved, a holding device associated with said lever and adapted to be moved laterally along said sleeve and thereby release said lever so that said lever may be moved to a position where it will be disengaged from said sleeve.

WILLIAM G. PRICE.

Witnesses:
DONALD M. CARTER,
BERTHA C. SIMS.